United States Patent [19]
El-Sobky

[11] Patent Number: 5,752,725
[45] Date of Patent: May 19, 1998

[54] JOINT

[76] Inventor: Hobab El-Sobky, P.O. Box 88, Manchester, Great Britain, M60 1OD

[21] Appl. No.: 481,502

[22] PCT Filed: Dec. 16, 1993

[86] PCT No.: PCT/GB93/02573

§ 371 Date: Aug. 28, 1995

§ 102(e) Date: Aug. 28, 1995

[87] PCT Pub. No.: WO94/15137

PCT Pub. Date: Jul. 7, 1994

[30] Foreign Application Priority Data

Dec. 19, 1992 [GB] United Kingdom ............... 9226489

[51] Int. Cl.$^6$ .................................................. F16L 13/02
[52] U.S. Cl. ............... 285/21.1; 285/288.1; 285/334.4; 285/423; 285/906; 228/2.3; 228/1; 228/114.5
[58] Field of Search .................... 285/382.7, 339, 285/342, 334.4, 421; 228/112.1, 114.5, 2.3

[56] References Cited

U.S. PATENT DOCUMENTS

| | | | |
|---|---|---|---|
| 3,351,512 | 11/1967 | Zelewsky et al. | 156/580 |
| 3,874,067 | 4/1975 | Toyooka et al. | 228/112.1 |
| 3,888,521 | 6/1975 | O'Sickey | 285/342 X |

FOREIGN PATENT DOCUMENTS

| | | | |
|---|---|---|---|
| 0242796A1 | 10/1987 | European Pat. Off. | F16L 15/04 |
| 62-009937 | 1/1987 | Japan | B29C 65/06 |
| 164194 | 7/1958 | Sweden | 285/334.4 |
| 392 858 | 5/1965 | Switzerland | B29C 19/02 |
| 2162607 | 2/1986 | United Kingdom | F16L 15/04 |
| WO 92/17328 | 10/1992 | WIPO | B29C 65/06 |

*Primary Examiner*—Dave W. Arola
*Attorney, Agent, or Firm*—Madson & Metcalf

[57] ABSTRACT

A joint between two hollow pipes is formed by inserting the pipes into a sleeve. The sleeve is made of a similar or compatible material to that of the pipes which are to be joined. The inner diameter of the sleeve increases from a middle portion outwardly to two end portions. The sleeve includes a pair of tapered collars which engage each end portion and abut the middle portion. Relative rotation of the pipes and sleeve causes melting and mixing of the pipe and sleeve surfaces. This mixing action eliminates the weld line present in known systems.

6 Claims, 13 Drawing Sheets

JOINT

The invention relates to a method and apparatus for joining together two or more lengths of a continuous section such as a pipe or a shaft or a rod, each having a substantially circular cross-section and particularly but not exclusively to a method or apparatus for joining sections formed from a material which softens or melts on heating such as thermoplastics, and metals such as steel or copper.

The invention is applicable to both solid and hollow sections and is particularly applicable to extruded plastics hollow pipe sections.

It is known to join two pipe sections by means of a friction welding process. Friction welding relies on generating heat at an interface between components to be welded by causing relative motion between them and applying suitable pressure on the interface to sustain the friction force. This motion could be linear or rotary and also could be oscillatory or continuous.

Conventionally, one of the components to be joined is moved towards or vibrated against the other. The heat generated at an appropriate rate by friction causes a layer of the surfaces of each component to melt at the interface. A degree of mixing of these layers due to the continuation of relative motion exists and the interface is gradually diffused forming a continuation of the material across the original interface.

The motion is then stopped and cooling is allowed to occur. The interfacial melt layer solidifies and forms a solid joint.

A disadvantage of this known process is that it is severely hampered in cases where one or both of the members of the joint is too large, heavy or already fixed in a structure, which makes the process of rotation and creating relative frictional motion too difficult or impossible.

In addition, in the case of axi-symmetric parts, such as solid round shafts, tubes or pipes, the welding process is restricted to forming joints having a coaxial configuration.

In a case where the material has a molecular or crystalline structure which can be controlled during the manufacturing stage of a pipe or a shaft by means of rotating dies, for example, an additional disadvantage of known welding operations which rely on heat by friction or any other means is observed. In some cases the structure of the material is given a particular pattern of orientation which is frozen in the material. This pattern may be lost, decreased or distorted during welding by conventional means.

It is known to join two hollow pipes formed by extrusion or any other method by means of a hot plate welding operation. In this method the ends of the pipes to be welded are placed in contact with a metal plate, which is electrically heated, one pipe at each side. The contact is sustained by applying a suitable axial force to the pipes against the plate sides. After a relatively short while (a few seconds), the heat from the plate causes a certain amount of the pipe material to melt. The plate is then removed and the pipes are pushed against each other. Contact takes place at the interface which is wetted by melt and suitable axial pressure is applied. The two molten layers at each of the pipe ends achieve contact and a bond takes place. Some of the melt material is squeezed out radially forming what is known as a welding bead. Upon cooling the joint becomes permanent and the bead is removed later by mechanical means.

Another known process for welding pipes together is a process known as electro-fusion. In this process the ends of the pipes are inserted into a specially designed cylindrical sleeve of suitable internal diameter. The sleeve contains a coil of electrically resistant wire incorporated in its body near the internal surface and with electrical contacts which are connected to an external source of electric current. With the pipes in position, the wire coil heats up upon passing a suitable current through it for a given length of time. This heat melts a sufficient amount of material from the pipes and the internal surface of the sleeve which fuse together forming a joint upon cooling. The sleeve remains in position and becomes a part of the joint. This process requires scraping the pipes on site in order to expose an un-contaminated or oxidised fresh surface.

The choice between these known methods depends on the size of pipe, the hot plate welding being used mainly in larger sizes, electro-fusion for smaller sizes mainly due to the high cost of making a large size sleeve. In both cases there is no mixing between the melt layers as there is little or no relative motion at the interface, therefore in the hot plate welding a weld line perpendicular to the axis of the pipes exists between the pipes, and in the electro-fusion welding also a weld line (or surface) exists on the interfacial circumferences between the pipes and the sleeve.

This weld line is in general a possible source of weakness, particularly in the case of fibre filled plastics as the fibres will not cross this weld line and thus the weld area will have different and inferior mechanical properties than the rest of the pipe.

In both cases any molecular orientation in the pipe material may be substantially damaged or lost in and near the weld zone due to the heating and melting period. Subsequent cooling leaves the molecules in this region in their natural pre-orientation coiled state and starved of reinforcing fibres if present in the pipe material. Any improvement due to the molecular or fibre orientation is thus locally lost.

These problems can be accounted for in the design, application and maintenance procedures, which normally lead to a high factor of safety and therefore increased material or other cost.

According to a first aspect of the invention there is provided a sleeve means for use in joining first and second lengths of a continuous section, each of which has a substantially circular cross-section, the sleeve means comprising:

a middle portion having an inner diameter which is substantially smaller than the outer diameter of the sections, and two end portions each having an inner diameter which is larger than that of the middle portion.

Advantageously, the sleeve means is formed from a material which is compatible with the material of each of the first and second sections.

If the sections are formed from a similar material to one another, then the sleeve means may be formed from that material. However, if the materials of the two sections are different and incompatible, the sleeve means may be made of a third material which is compatible with each of the materials forming the first and second sections. This allows two incompatible components to be joined together.

If the sections to be joined are hollow the inner diameter of the middle portion will be substantially the same as the inner diameter of each of the sections.

Advantageously, the sleeve means comprises a first collar and a second collar, and an intermediate sleeve positioned between the first collar and the second collar.

Preferably, the internal diameter of each end portion of the sleeve means is tapered such that it increases towards the end of the sleeve. This enhances the flow of material during the melting process and ensures continuous contact with the collar.

The addition of the collars on either side of the sleeve enable welds to be carried out at any angle between the axes of the two sections to be joined, and also allows the materials of the collar and sleeve portion to be varied as appropriate, in order that two pipes made of incompatible materials or different grades may be joined together in such a way as to enhance the quality of the weld.

Preferably, the sleeve further comprises an abutment portion between the middle portion and each end portion for accurately positioning each section within the sleeve. The abutment portion also acts as a stop for the collar.

According to a second aspect of the invention there is provided a method of joining first and second lengths of a continuous section, each of which has a substantially circular cross-section, the method comprising the steps of:

inserting each section into opposite ends of a sleeve means, which sleeve means comprises a middle portion having an inner diameter which is smaller than the outer diameter of the sections and two end portions having an inner diameter which is larger than that of the middle portion; and rotating the sleeve relative to the sections The method according to the second aspect of the invention may be used in connection with sections made from any thermoplastic material, whether that material is oriented or not, and whether the material has fibres in it or not. It may also be used in connection with the sections formed from metals, and any other material which may melt or soften by heat.

The method may be used in connection with solid sections, but is particularly appropriate for hollow sections, for example, hollow pipe sections.

Advantageously, the method comprises the step of rotating the sleeve means whilst preventing rotation of the sections.

In other words, relative motion of the sleeve means and the sections is achieved by moving the sleeve means whilst keeping the section stationary. This obviates the need to rotate the sections themselves and therefore reduces or completely eliminates problems associated with the rotation of large masses. It also overcomes the problems which arise when a pipe section is immoveable, for example, because it is in a fixed position.

Preferably, the sleeve means comprises:

a first collar and a second collar and an intermediate sleeve positioned between the first collar and the second collar.

According to a third aspect of the invention there is provided an apparatus for joining first and second lengths of continuous section, each of which has a substantially circular cross-section, by inserting the first and second lengths into a sleeve system, the apparatus comprising:

clamping means for clamping the sleeve system;

gripping means for gripping the sections; and rotating means for rotating the sleeve system whilst maintaining the sections stationary.

The invention will now be further described by way of example only with reference to the accompanying drawings in which.

Figure 1:
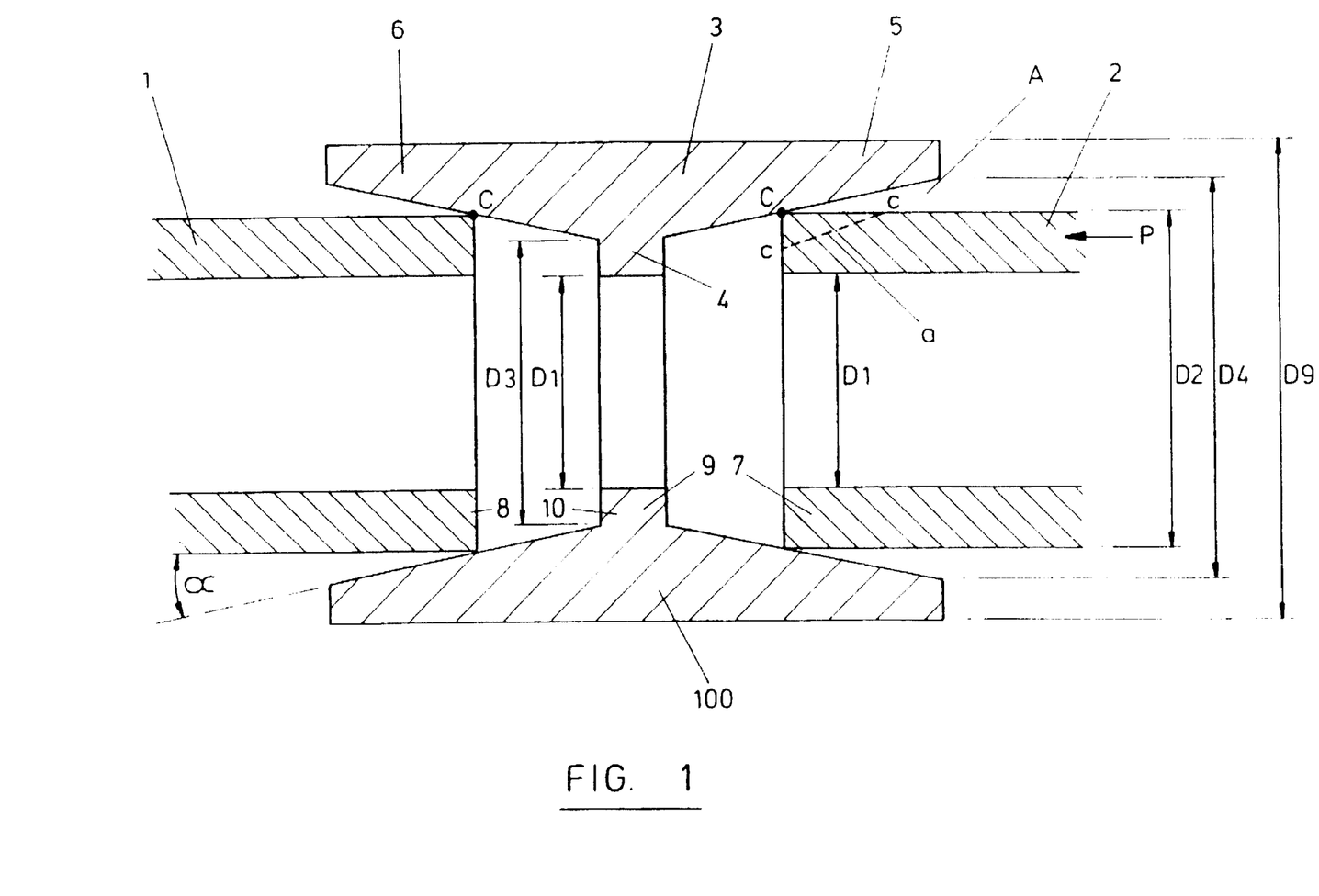
FIG. 1 a schematic representation of a sleeve according to the present invention.

Referring to FIG. 1, the sleeve according to the present invention is designated generally by the reference numeral 100. Two continuous sections to be joined in this case hollow pipes 1 and 2, are inserted into opposite ends of the sleeve and held stationary while the sleeve 100 is rotated. Axial pressure is applied in the direction of the arrows. Melt due to friction begins to form at circumference point C. The pipe could be chamfered as indicated by a dotted line c—c to increase the initial contact area.

The sleeve 100 is made of a similar or compatible material to that of the pipes 1, 2 which are to be joined. The sleeve is generally cylindrical, with a middle disc portion 4 of internal diameter D1 substantially equal to that of the internal diameter of each pipe 1, 2. In addition, the sleeve 100 has an outer diameter D3. The remainder of the sleeve is formed from two end portions 5, 6 which are tapered internally. Their internal diameters increase from D3 where the middle section ends to D4 at each end. The diameter D3 is slightly smaller than the external diameter D2 of the pipes 1, 2 and the diameter D4 is slightly larger than the pipe outer diameter D2.

The outer diameter D9 of the sleeve 1 is chosen to be larger than diameter D2. The change in diameter from D2 to D4 defines an angle $\alpha$ between the internal surface of the sleeve and the outer surface of the pipe, which in turn defines two conical spaces A and B.

When the pipes 1, 2 are inserted into the two end portions 5, 6 of the sleeve 100 they contact the sleeve initially at C, or if the surface is chamfered along A, at line c—c. The axial pressure ensures this contact remains whilst the sleeve 100 is rotated. The pipes are held in position while the sleeve is gripped by rotational equipment. The friction under force at C (or c—c) causes melting to occur and the axial pressure causes the melt to flow outwards and inwards in the conical gaps A and B, between the sleeve 100 and the pipes 1, 2 and ensures that the frictional contact is renewed.

The rotation and axial motion under axial pressure continues until the end surface 7, 8 of the pipes 1, 2 respectively meet the end surface 9, 10 of the inner disc portion 4. The melt flows to fill the gaps in A and B.

During the rotation a tangential shear stress exists between the surfaces of the sleeve 100 and the pipes 1, 2 which causes the molten layers for these surfaces to form a uniform mixture. This mixing action eliminates the weld line present in known systems as described previously in this specification.

In addition the melt layer is subjected to circumferential rotation and acquires molecular orientation in that direction. This orientation is largely retained in the joint after cooling. This enhances the strength of the joint in this region. If the pipes are oriented circumferentially, or have a component of circumferential orientation as well as axial orientation, which can be achieved by using a die with a rotating mandrel, for example, the direction of rotation of the sleeve in the welding process (ie clockwise or anti-clockwise) can be chosen such that the welding melt has circumferential molecular orientation in the same direction as that of the pipes 1, 2.

For fibre filled pipes, similar material is used for the sleeve with similar fibre concentration. The mixing action of the shear during rotation and melting will cause the fibre to cross the boundary between the pipe material and sleeve, and also acquire a similar orientation in the same way as that described above, and thus avoid the formation of a fibre starved weld zone.

Figure 2:
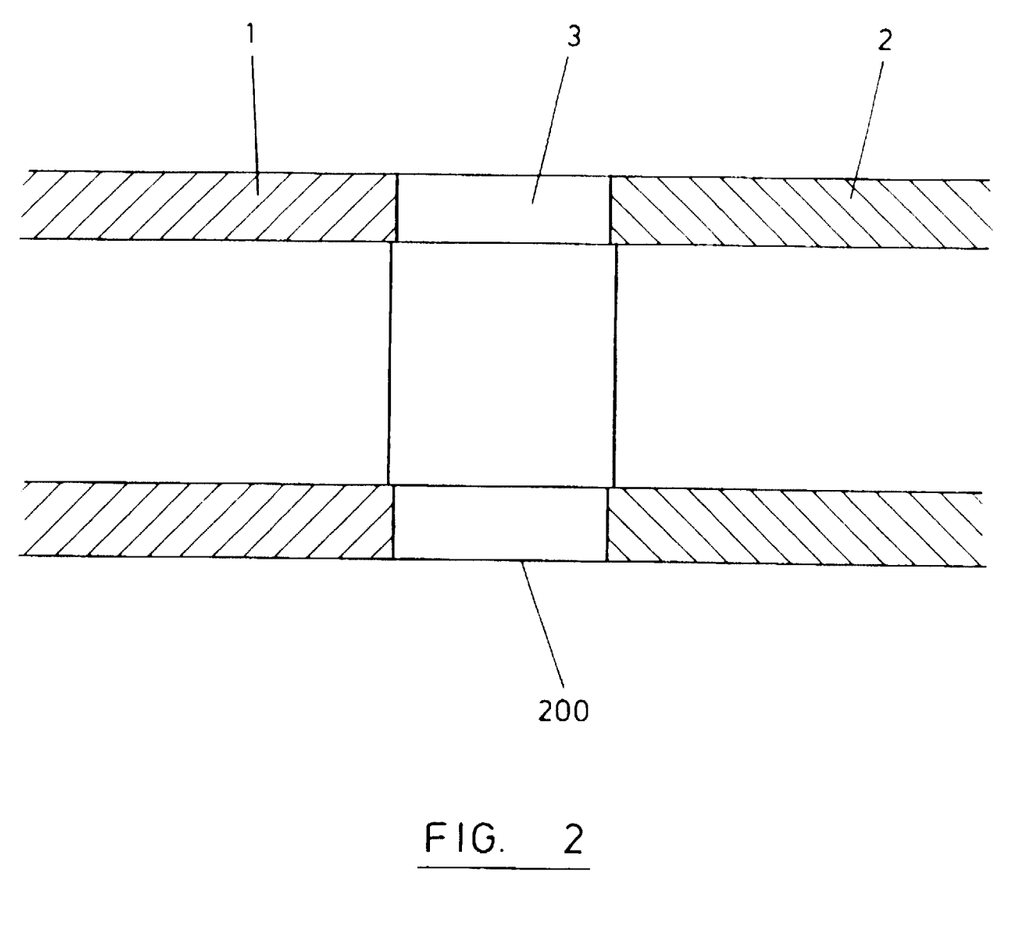
FIGS. 2 to 4 are schematic representations of different embodiments of the sleeve of FIG. 1.
Figure 3:
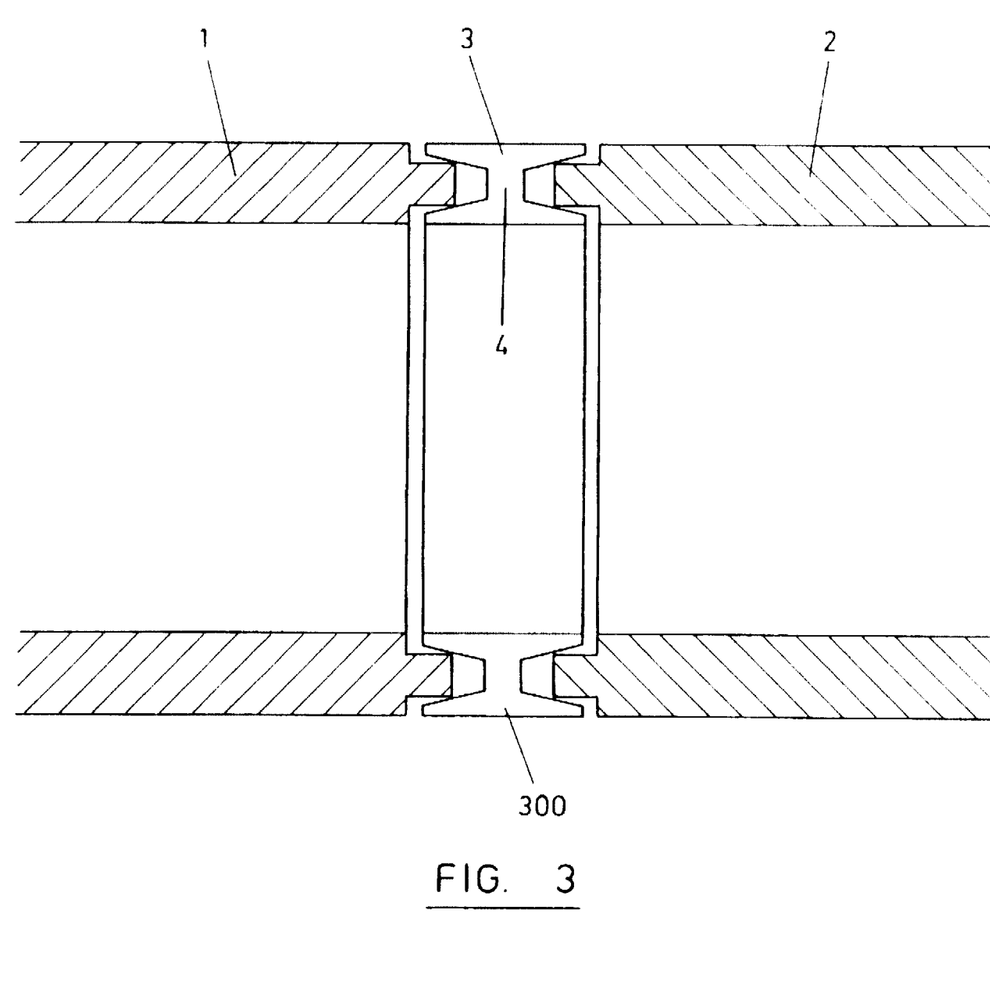
Figure 4:
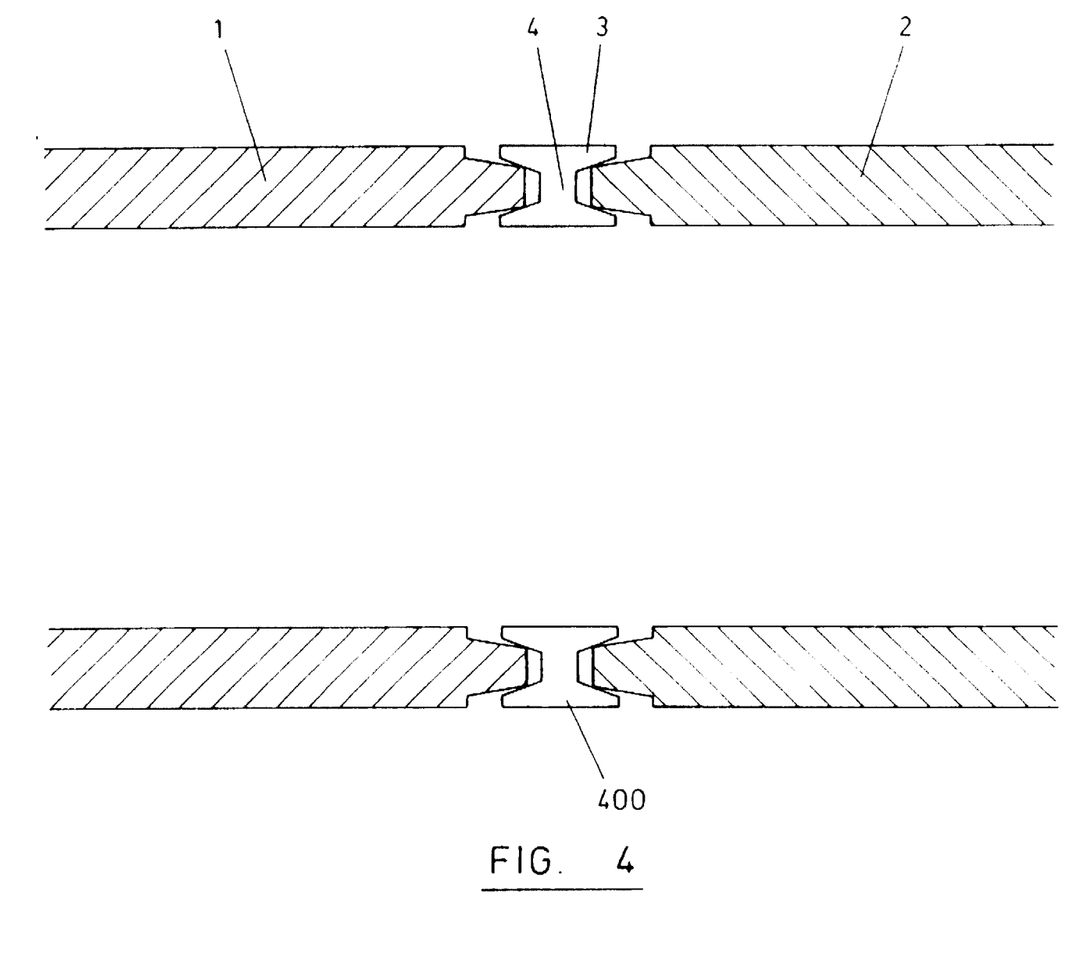
Figure 5A:
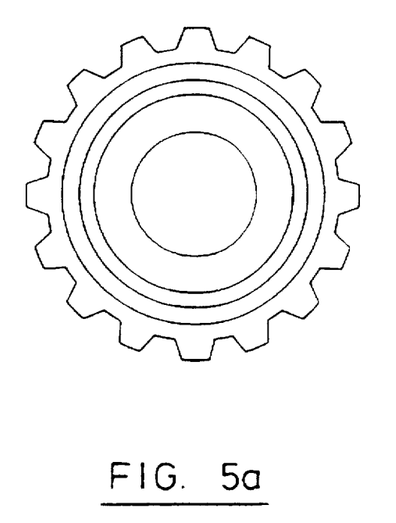
FIGS. 5 and 6 are schematic representations of sleeves according to the present invention incorporating gears on their external surfaces.
Figure 5B:
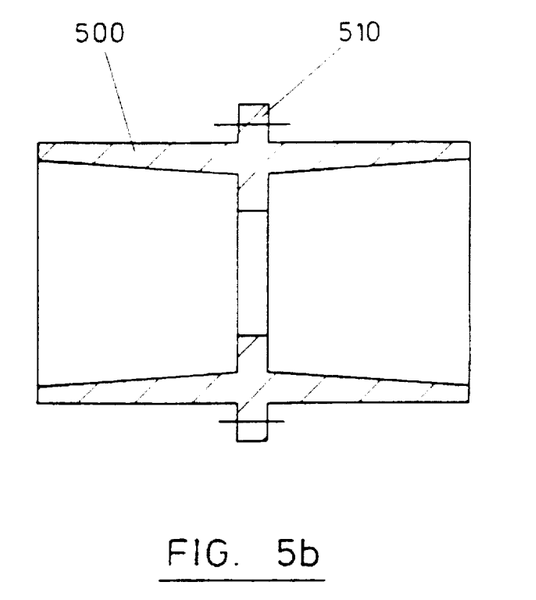
Figure 6A:
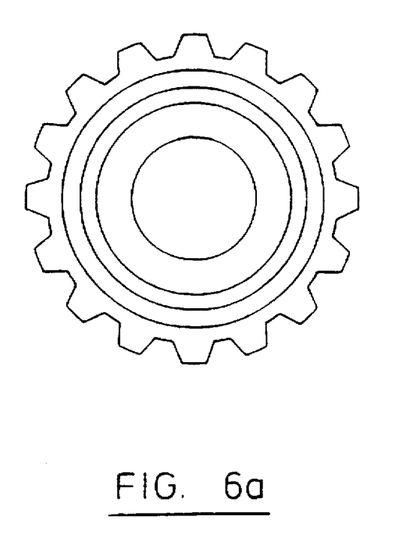
Figure 6B:
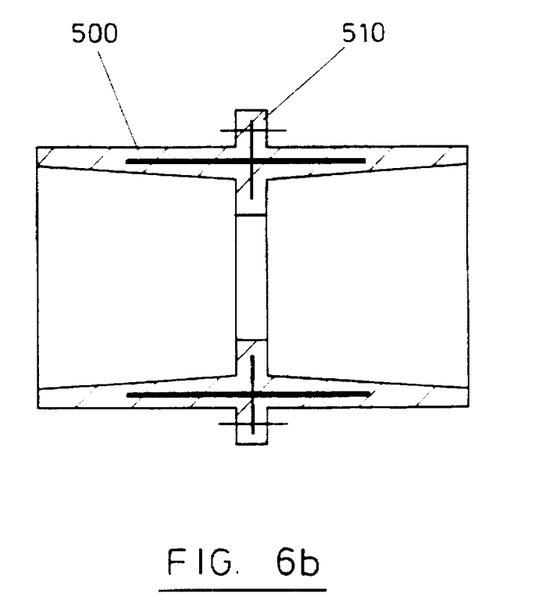

FIGS. 2 to 4 illustrate further possible shapes for the sleeve according to the present invention.

FIG. 2 illustrates a sleeve 200, which has straight edges and can be used to produce a joint for the same internal and external diameters as the pipes 1, 2. FIG. 3 illustrates a sleeve 300 having the same element as those shown in FIG. 1, but allowing an increased area for frictional melting and works like sleeve 200. FIG. 4 illustrates a similar sleeve 400. Pipes 1, 2 to be joined using a sleeve 400 (FIG. 4) have to have their ends chamfered or machined as shown, to ensure good initial contact with the sleeve.

Referring to FIGS. 5a, 5b, 6a and 6b, a sleeve 500 is illustrated schematically. The sleeve 500 comprises grooves in the form of gears formed on an outer middle portion 510 of the sleeve 500. The gears or teeth are included to be engaged with rotational equipment in order to facilitate rotation of the sleeve. The teeth can be moulded into the sleeve or they can be machined afterwards.

The sleeves illustrated may be moulded with internal metallic insert to enhance the rigidity and strength of the sleeve especially in the case of soft materials.

For use with the pipes which are not coaxial or of different sizes, the sleeve is manufactured with two or more cylindrical openings, the centre lines of which are aligned along any desired direction relative to each other.

Figure 7A:
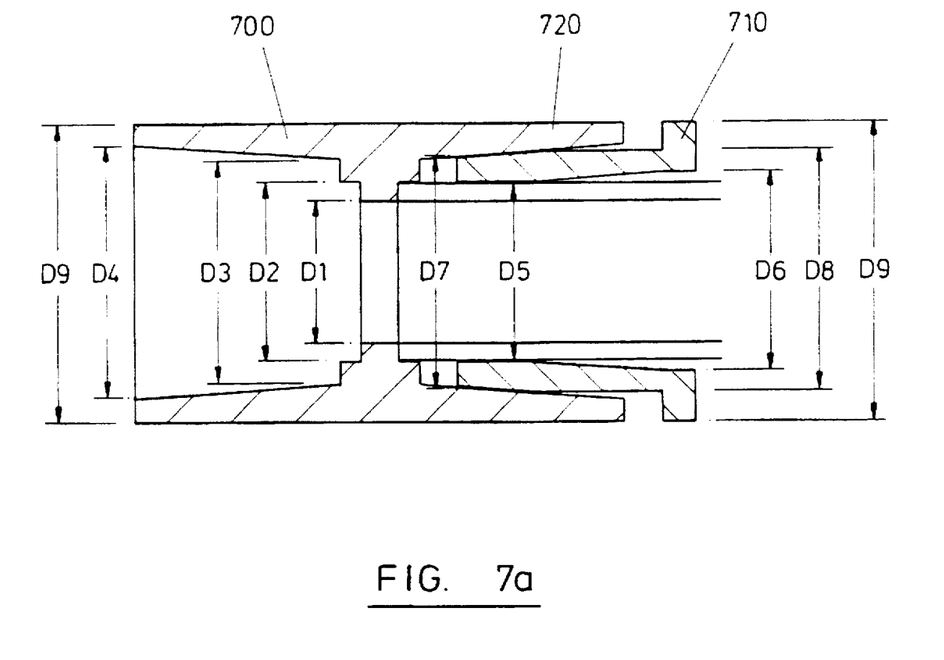
FIGS. 7a and 7b are schematic representations of a collar according to the present invention.
Figure 7B:
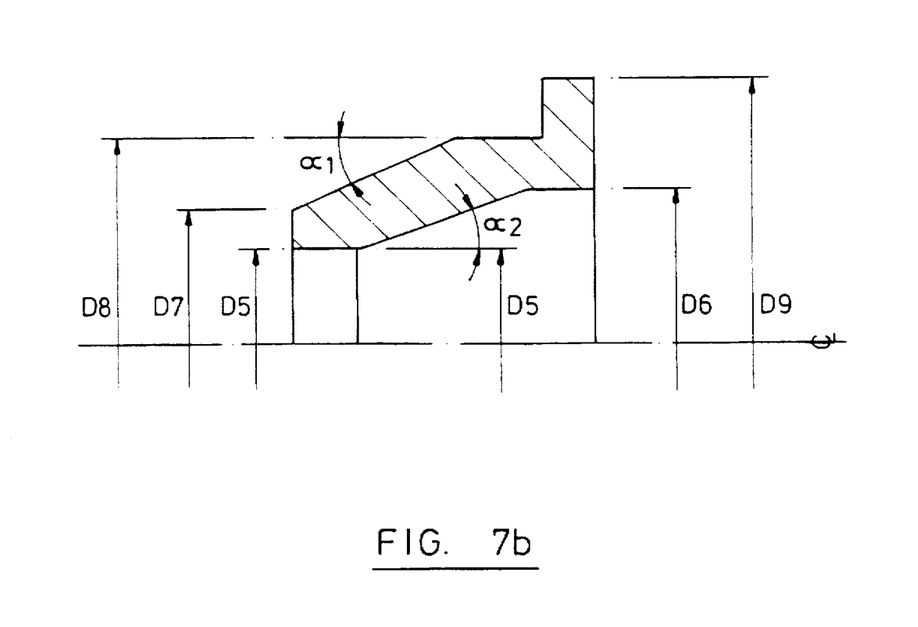

Referring to FIGS. 7a and 7b, a sleeve system according to the present invention is designated generally by the reference numeral 700. The sleeve system 700 comprises two collars 710 (only one of which is shown), positioned on either side of a sleeve 720. The collar may also be made by moulding or machining from a material similar to or compatible with that of the pipes. During welding, the pipes (not shown here) and sleeves 720 are held in position whilst the collars are rotated simultaneously, or one at a time depending on the type of equipment used.

The sleeve 720 comprises a two step internal diameter of the middle section. The first internal diameter is used to locate a pipe 1, and the internal second diameter is used to mark the end of the axial travel of the collar when it is being appropriately positioned.

The collars 710 each have an internal diameter D5 equal to the outer diameter D2 of the pipes 1, 2. The internal surface of each collar 710 continues at this diameter for a distance S, and then increases gradually to D6 which is larger than the outer diameter D2 of the pipe 1. The external surface of each collar has a diameter D7, which is larger than D3. It increases gradually towards the opening to a diameter D8 which is smaller than D4. The collar comprises a flange 730 at an outer end having a diameter D6.

When each collar 710 is rotated, the process is exactly as described earlier and welding occurs at the inner and outer surfaces of the collar. Each collar may also be fibre filled, reinforced with an insert and its flange may be formed as a gear to enhance the gripping and rotation action of the rotational equipment used to rotate the collar. The gear teeth or serrations or grooves can either be on the external surface of the flange, or on the internal surface near the edge.

Melting occurs on the surface S and C and the melt flows under axial force in the direction of the pressure P into gaps A, B, C. The welding, melt formation and orientation of molecules and the fibres takes place in the same fashion as explained above.

Figure 8A:
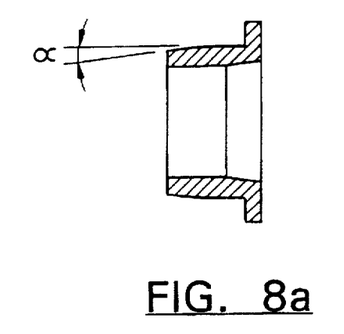
FIGS. 8a to 8i are schematic representations of further embodiments of collars according to the present invention.
Figure 8B:
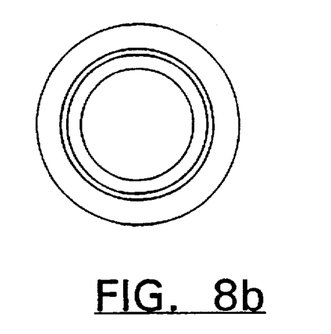
Figure 8C:
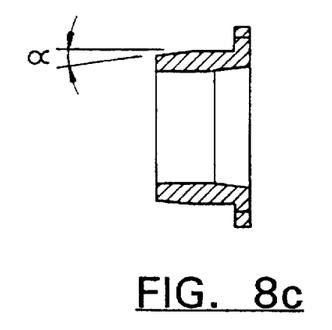
Figure 8D:
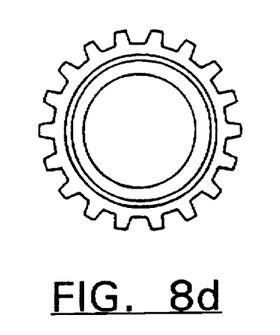
Figure 8E:
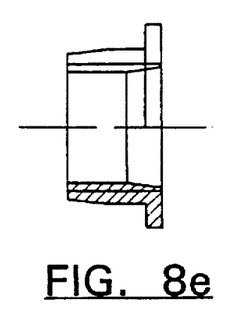
Figure 8F:
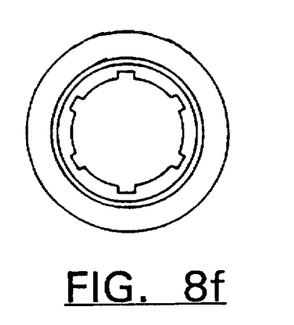
Figure 8G:
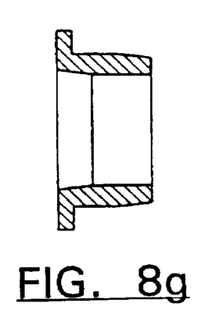
Figure 8H:
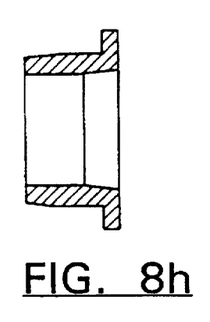
Figure 8I:
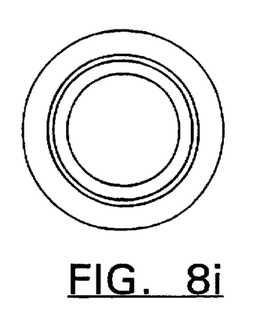
Figure 9A:
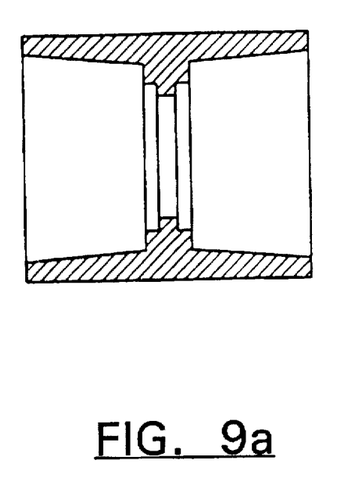
FIGS. 9a and 9b are schematic representations of another embodiment of the sleeve and collar system according to the present invention.
Figure 9B:
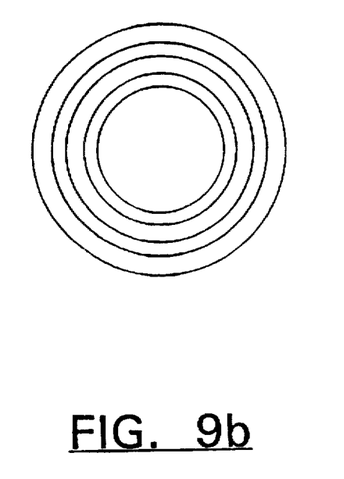
Figure 10:
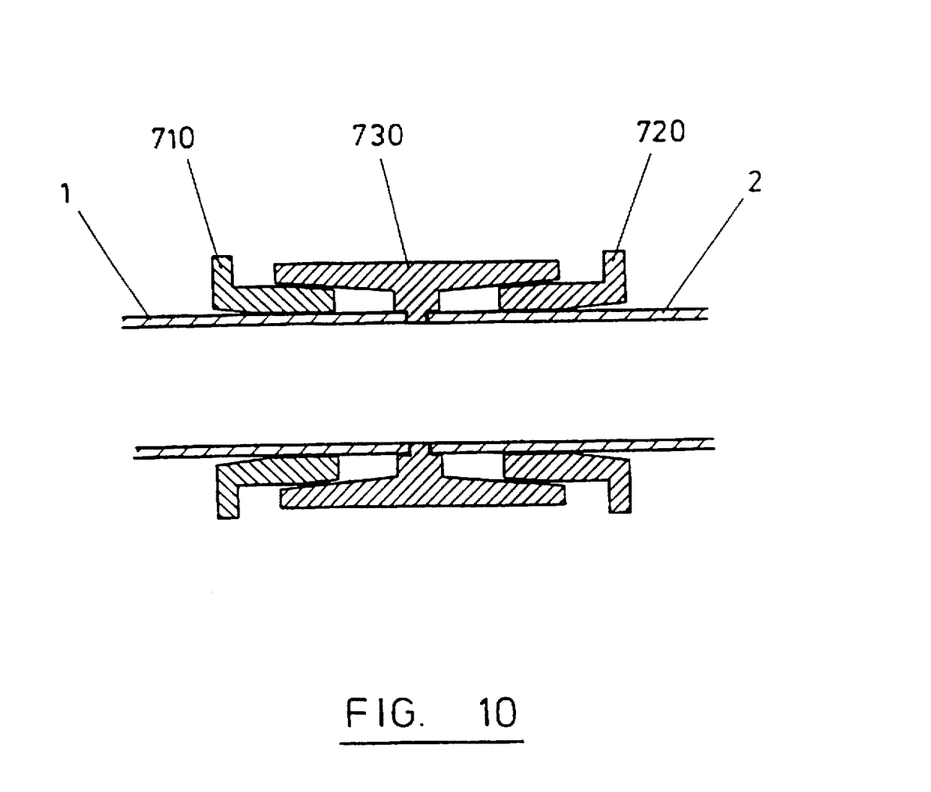
FIG. 10 is a schematic representation of a collar, sleeve and pipe assembly prior to the welding process having been carried out.
Figure 11:
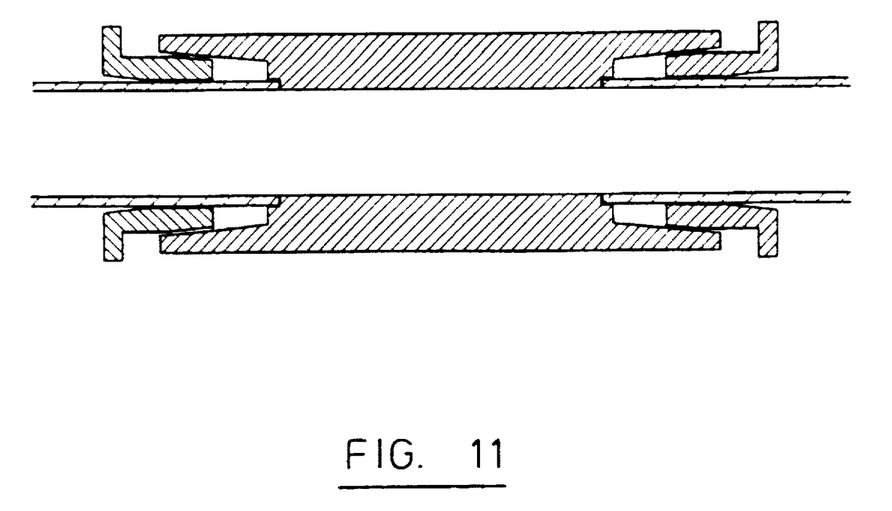
FIGS. 11 to 16 are schematic representations of collar, sleeve and pipe arrangements showing possible welding configurations.
Figure 12:
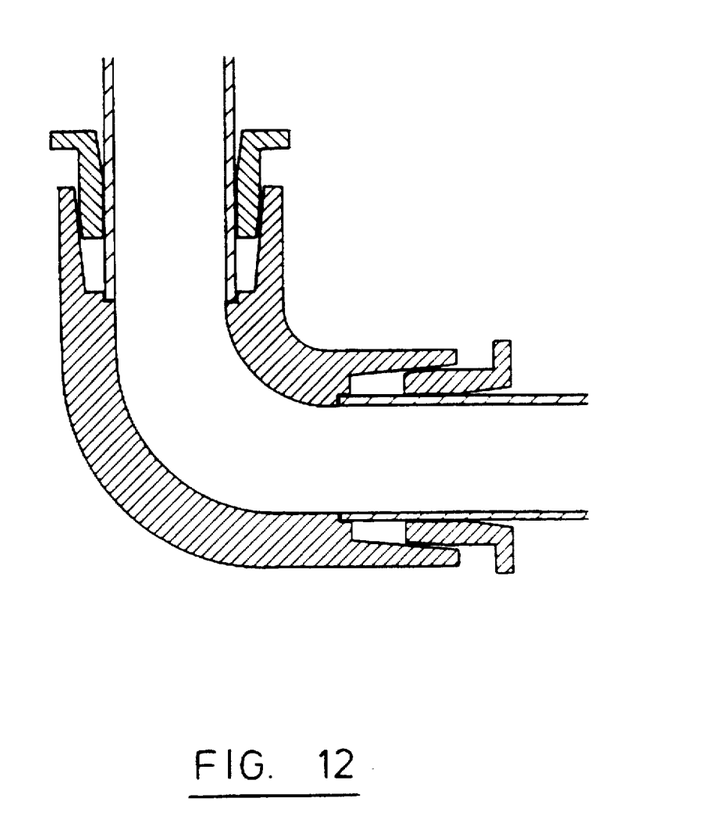
Figure 13:
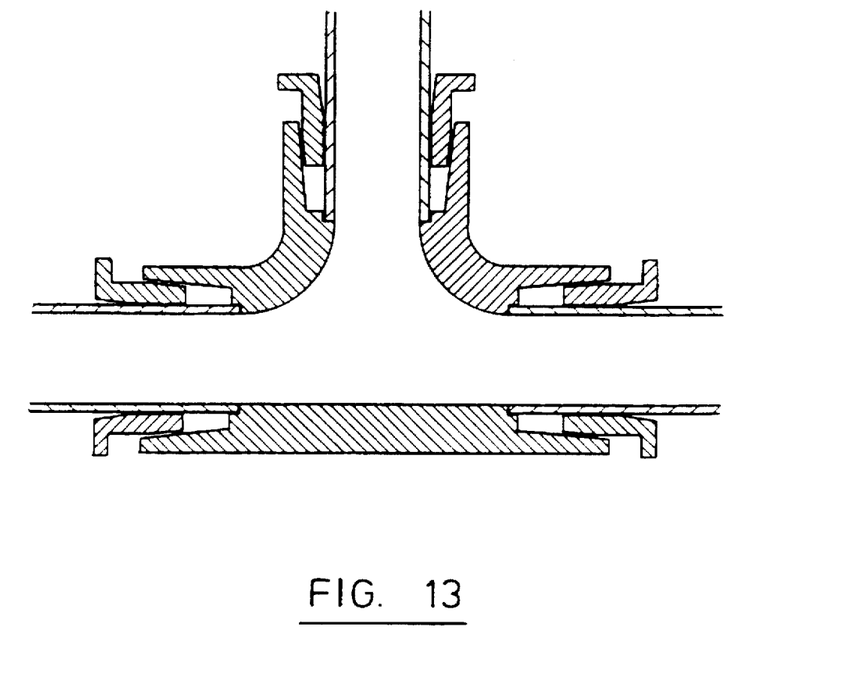
Figure 14:
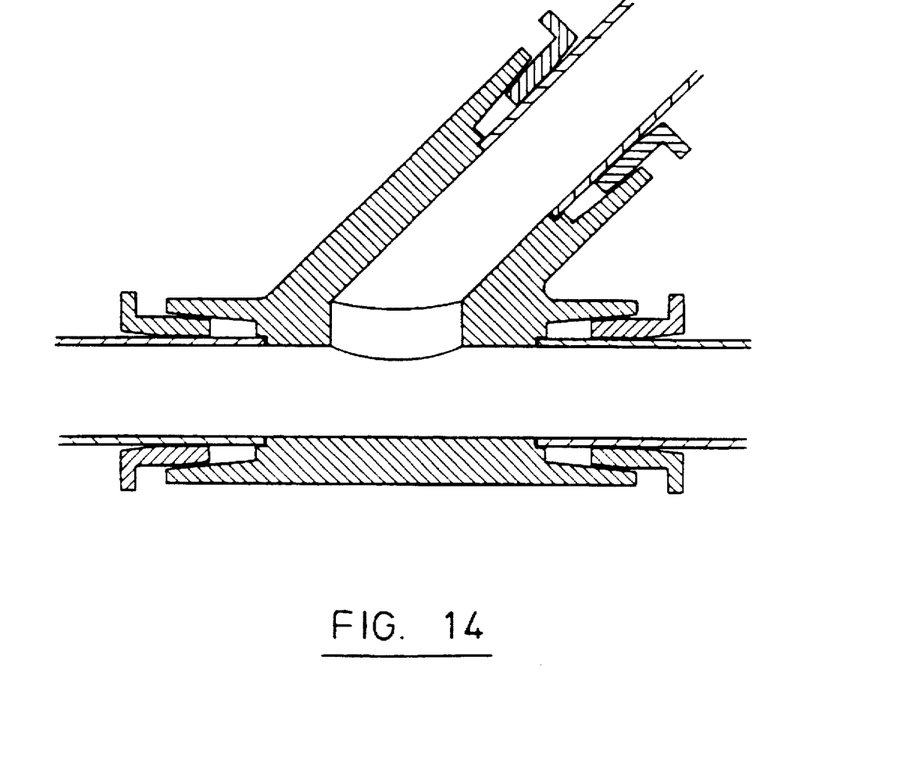
Figure 15:
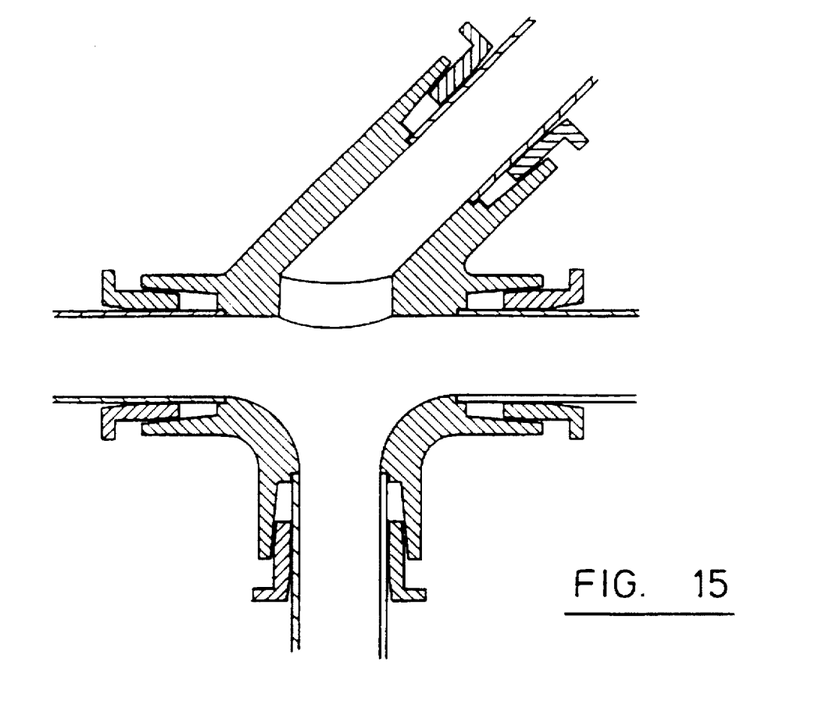
Figure 16:
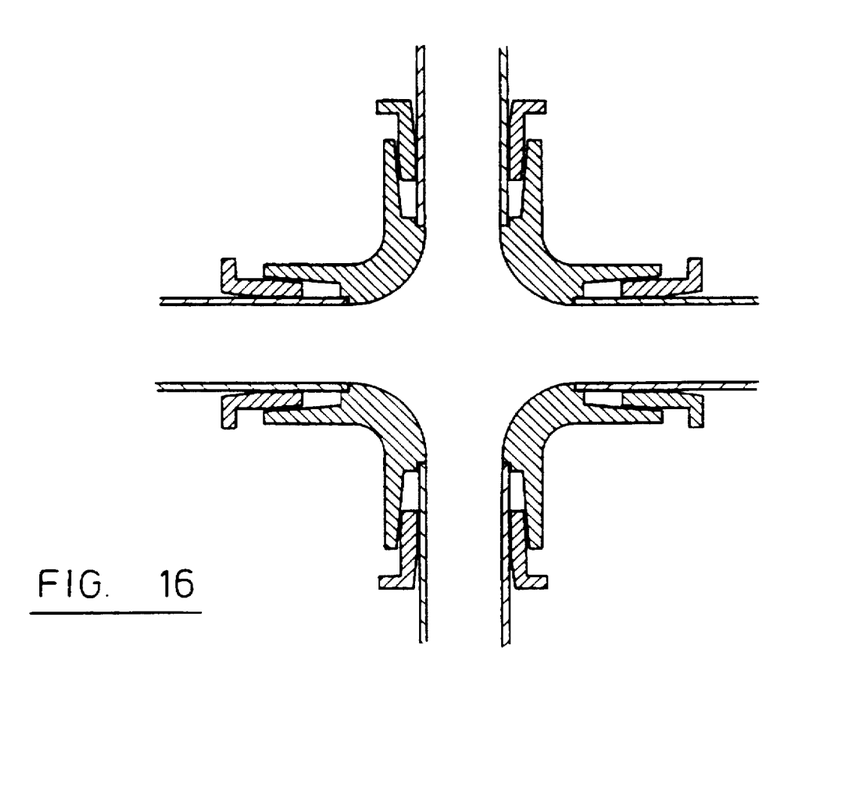

FIGS. 8a to 8f illustrate different designs for collars and FIG. 8g to 8i illustrates an example of a sleeve. The internal grooves in FIG. 8c also act as melt channels. FIG. 10 illustrates an assembly of the similar pipes 1, 2, collars 710, 720 and sleeve 730 positioned prior to the welding operation.

The sleeve 710 can have two different sizes and positions for welding pipes with different dimensions.

FIGS. 11 to 16 illustrate different designs of pipe, collar and sleeve assemblies showing the different angles which may be achieved by means of the present invention.

Figure 17A:
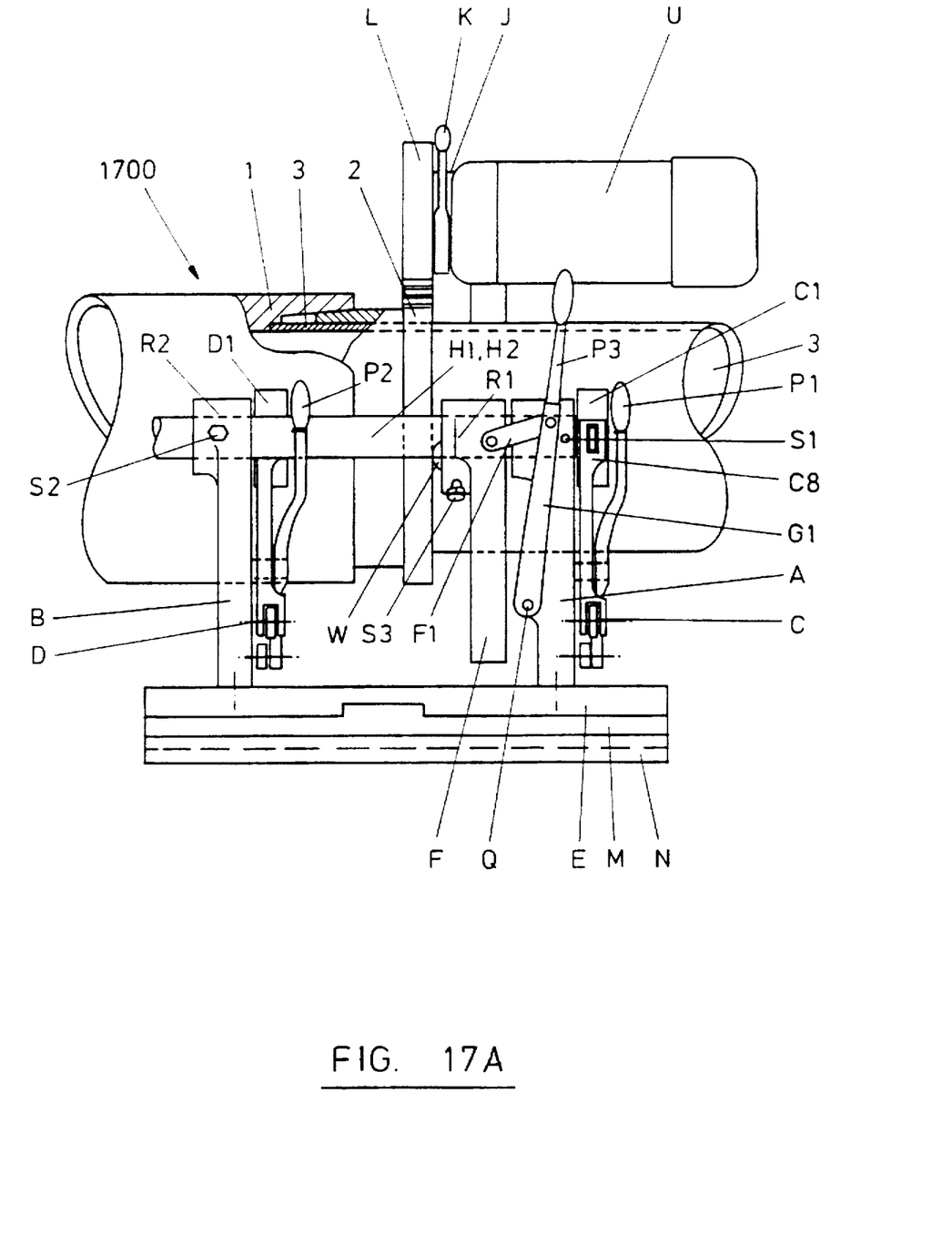
FIG. 17 is a schematic representation of an apparatus according to the present invention.
Figure 17B:
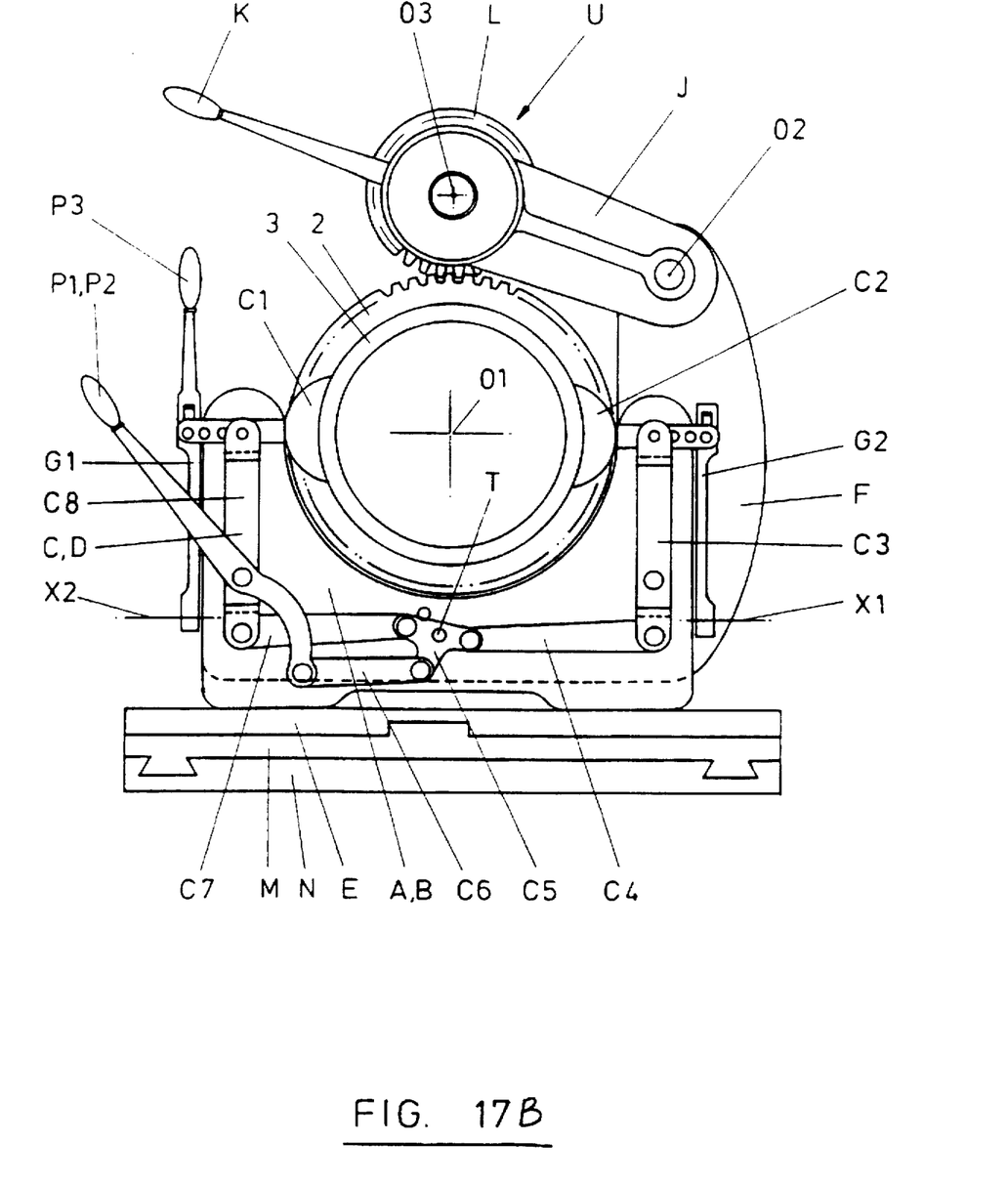

Referring to FIG. 17, an apparatus for forming a welding joint according to the present invention is illustrated generally by the reference numeral 1700. The apparatus 1700 is used to grip a sleeve assembly according to the present invention, and to rotate collars in an arrangement similar to FIG. 11. It can also be used to grip pipes and rotate the sleeves for cases where the pipes are coaxial, and direct rotation of the sleeve achieves the welding without using a collar as described with reference to FIG. 1.

One unit can be used to create one joint at a time at each end of the sleeve, or in the case of multiple joints such as those illustrated in FIGS. 11 to 16, at each opening. Alternatively, more than one unit can be combined to perform more than one joining operation at the same time at each end or opening of the sleeve.

The apparatus 1700 comprises a frame made up of two parallel brackets A and B made of steel plates and shaped with a semi-circular opening in the middle, to allow for the pipes and sleeve to be placed within the brackets. The brackets are fixed to a base E a suitable distance apart. Each of the brackets A and B carry a clamping mechanism C and D correspondingly. Clamp C holds the right hand side pipe in a fixed position, and clamp D holds the sleeve in a fixed position.

The clamping action is achieved by means of toggle mechanisms $T_1 T_2$ which operate clamping pads C1, C2 and D1, D2 by means of handles P1 and P2. The action of the handle P1 are transmitted to C1, C2 and D1, D2 by means of a series of levers C3 to C8 as shown. Similarly the action of handle P2 is transmitted to D1, D2 by an identical mechanism comprising a set of levers D3 to D8 also identical to C3 to C8.

The pads C1, C2 and D1, D2 have the same radius as the pipe and the sleeve respectively and the same centre O1 and thus ensure that the sleeve and the pipe remain concentric throughout the operation.

The bracket A carries two round polished linear motion guides H1 and H2 fixed to it at one end by means of screws S1. The guides H1, H2 extend horizontally through a floating bracket F, placed between A and B through guide holes R1 within F and further through B through guide holes R2.

The guides H can be fixed at R2 by means of screw S2. This allows the initial distance between A and B to be adjustable as required before fixing them to the base E.

The dimension of holes R1 are such that the floating bracket F can slide along H.

The floating bracket F has a similar semi-circular opening as that of brackets A and B. It also has two wheels W1, W2 fixed to rotate freely on two shafts mounted on F and can move towards or away from the centre line of the assembly by means of a screws S3, S4.

The wheels W can be brought into contact with the collar 2 by moving F axially.

The floating bracket is connected on both sides of the pipe to the fixed bracket A by means of a symmetrical system of levers F1 and F2 which are pivoted to it and also to levers G1 and G2.

The levers G1 and G2 are fixed to a connecting rod Q which penetrates brackets A and is pivoted about the centre line X1–X2.

The lever P3 can thus operate G1, and also G2 via Q to move the floating plate axially.

The bracket F extends vertically behind the assembly where another bracket J is hinged to it about centre O2.

A lever K is attached to J and is used to turn J about O2 to adjust its angular position. A motor U attached to a gear L which is mounted on J such that its axis O3 is parallel to the axis of the pipe O1. The length O2–O3 is chosen such that when J is lowered by means of K, the gear L comes into contact and engages with the integral teeth on the flange of the collar.

The gear L can be replaced by another means of transmitting rotary motion to the collar or the sleeve for the case when there are no teeth integral with the flange. Such means could be a rubber wheel, instead of the gear, which drives the flange by frictional contact without slip.

Method of Operation

1. The sleeve 1 is fixed in position by means of the pads D1, D2 and the action of lever P2.

2. The collar 2 is slid on the pipe 3 prior to clamping the pipe in its fixed axial position, and then the collar and pipe are moved axially towards the sleeve until the pipe resets within the central portion provided for it as described above.

3. The pipe is then clamped by means of C1, C2 and the action of lever P1 as described above.

4. The collar is then slid on the pipe axially towards the sleeve until it contacts the tapered internal end portion of the sleeve 100.

5. The lever K is then used to lower J such that L engages the collar.

6. The lever P3 is then used to slide the floating bracket F towards the collar and contact is achieved between the collar and the wheels W.

7. The collar is thus axially constrained by the contact with the sleeve and the wheels W. The motor is then switched on and the collar begins to rotate at the required speed, typically about 500 R.P.M. The motion of P3 is continued until the flange edge contacts the edge of the sleeve or until it is stopped by other means at a position adjusted prior to the operation.

Mechanical or electrical means can be placed on the guides H to assist the axial location of the sleeve and end the sliding of bracket F.

The rotation is maintained for a few seconds, when the final axial positioned has been reached.

The process of melting by frictional heat, melt rotation viscous heating and orientation take place as described earlier followed by cooling, solidification and formation of the permanent joint as described earlier.

I claim:

1. A sleeve means for use in joining, by melting, first and second lengths of a continuous section, each of which has a substantially circular cross-section, the sleeve means comprising:

a middle portion having an inner diameter and two end portions each having an inner diameter which is larger than that of the middle portion;

a first collar removably engageable in a first end portion, and abuttable with the middle portion, and a second collar removably engageable with a second end portion and abuttable with the middle portion, the middle portion forming an intermediate sleeve portion, and the first and second collars each adapted to receive a length of continuous section;

characterized in that the internal diameter of each collar is tapered such that it increases towards one end of the collar, and in that the outer diameter of each of the collars tapers towards the other end of the collar at a substantially different angle to the angle at which the inner diameter of the respective end portion of the sleeve tapers, such that the outer tapered diameter of the collar and the inner diameter of the end portion are spaced apart from one another, whereby relative rotation of the continuous sections and the sleeve means results in melting of the continuous sections and the sleeve means, thereby forming a weld.

2. A sleeve means according to claim 1 wherein the sleeve means is formed from a material which is compatible with a material of each of the first and second sections.

3. A sleeve means according to claim 2 wherein the intermediate sleeve further comprises an abutment portion between the middle portion and each end portion.

4. A sleeve means according to claim 1 wherein the intermediate sleeve further comprises an abutment portion between the middle portion and each end portion.

5. A method of joining first and second lengths of a continuous section, each of which lengths has a substantially circular cross-section, the method comprising the steps of:

inserting each section into opposite ends of a sleeve means, which sleeve means comprises a middle portion having an inner diameter and two end portions having an inner diameter which is larger than that of the middle portion and a first collar removably engageable in a first end portion, and abuttable with the middle portion and a second collar removably engageable with a second end portion and abuttable with the middle portion, the middle portion forming an intermediate sleeve portion, and the first and second collars each adapted to receive a length of continuous section wherein the internal diameter of each collar is tapered such that it increases towards the ends of the collar, and in that the outer diameter of each collar tapers towards the end of the collar at a substantially different angle to the angle at which the inner diameter of the middle portion tapers such that the outer diameter of the collar and the inner diameter of the middle portion are spaced apart from one another to facilitate flow of melted material and continuous contact with the collar; and rotating the sleeve means which preventing rotation of the sections which rotation causes melting, due to friction of the sleeve means and the continuous sections, thereby forming a weld.

6. Apparatus for joining first and second lengths of continuous section, each of which lengths has a substantially circular cross section which lengths are to be joined by inserting the first and second lengths into a sleeve means the sleeve means comprising a middle portion having an inner diameter which is substantially smaller than the outer diameter of the sections, and two end portions each having an inner diameter which is larger than that of the middle portion; a first collar removably engageable in a first end portion, and abuttable with the middle portion, and a second collar removably engageable with a second end portion and abuttable with the middle portion, the middle portion forming an intermediate sleeve portion, and the first and second collars each adapted to receive a length of continuous section; the apparatus comprising:

clamping means for clamping the sleeve system;
gripping means for gripping the sections; and
rotating means for rotating the sleeve means which maintaining the sections stationary.

* * * * *